United States Patent [19]

Chen

[11] Patent Number: 4,684,514
[45] Date of Patent: Aug. 4, 1987

[54] HIGH PRESSURE PROCESS FOR SULFUR RECOVERY FROM A HYDROGEN SULFIDE CONTAINING GAS STREAM

[75] Inventor: Michael S. Chen, Zionsville, Pa.

[73] Assignee: Air Products and Chemicals, Inc., Allentown, Pa.

[21] Appl. No.: 757,571

[22] Filed: Jul. 22, 1985

[51] Int. Cl.$^4$ .............................................. C01B 17/02
[52] U.S. Cl. ........................... 423/574 R; 423/573 R; 423/573 G
[58] Field of Search ............... 423/574 R, 576, 573 R, 423/573 G, 574 L

[56] References Cited

U.S. PATENT DOCUMENTS

| | | | |
|---|---|---|---|
| 2,200,928 | 5/1940 | Lindblad et al. | 23/225 |
| 2,258,305 | 10/1941 | Stirlen | 23/225 |
| 2,298,641 | 10/1942 | Schulze et al. | 23/225 |
| 2,413,714 | 1/1947 | Hujsak et al. | 423/576 |
| 3,681,024 | 8/1972 | Keeling | 423/574 R |
| 3,702,884 | 11/1972 | Hemt et al. | 423/222 |
| 3,749,762 | 7/1973 | Montgomery | 423/574 |
| 3,822,341 | 7/1974 | Smith | 423/574 |
| 4,138,473 | 2/1979 | Gleck | 423/574 |
| 4,279,882 | 7/1981 | Beavon | 423/574 |
| 4,280,990 | 7/1981 | Jagodyinski et al. | 423/574 |
| 4,302,434 | 11/1981 | Hellmer et al. | 423/573 |
| 4,419,337 | 12/1983 | Jagodzinski et al. | 423/574 |
| 4,426,369 | 1/1984 | Palm | 423/574 R |
| 4,430,317 | 2/1984 | Reed et al. | 423/574 R |
| 4,526,590 | 7/1985 | Palm et al. | 423/574 R |

OTHER PUBLICATIONS

Gray and Sorcek, "Oxygen Use in Claus Sulphur Plants", Gas Conditioning Conference, Norman, Ok 3/2-4/81.

Steppe, Cumare, Findley, "Parsons Sulphur Recovery", Sulphur-84 International Conference 6/3-6/84, Calgary, Alberta.

*Primary Examiner*—Gregory A. Heller
*Attorney, Agent, or Firm*—G. L. Chase; J. C. Simmons; E. E. Innis

[57] ABSTRACT

An improved method of recovering sulfur from a hydrogen sulfide-containing gas stream which removes water concurrently with the condensation of sulfur and which can be operated at high pressure.

17 Claims, 9 Drawing Figures

CLAUS THREE-STAGE SULFUR RECOVERY PROCESS

HIGH PRESSURE CLAUS THREE-STAGE RECOVERY PROCESS WITH CONCURRENT SULFUR AND WATER CONDENSATION

HIGH PRESSURE OXYGEN-BASED CLAUS THREE-STAGE SULFUR RECOVERY PROCESS WITH CONCURRENT SULFUR AND WATER CONDENSATION AND LIQUID WATER INJECTION

HIGH PRESSURE CLAUS THREE-STAGE SULFUR RECOVERY PROCESS WITH CONCURRENT SULFUR AND WATER CONDENSATION AND LIQUID SULFUR RECYCLE

HIGH PRESSURE OXYGEN-BASED NON-CATALYTIC CLAUS SULFUR RECOVERY
PROCESS WITH CONCURRENT SULFUR AND WATER CONDENSATION AND ACID GAS AND LIQUID SO2 RECYCLE

HIGH PRESSURE OXYGEN-BASED NON-CATALYTIC CLAUS SULFUR RECOVERY PROCESS WITH CONCURRENT SULFUR AND WATER CONDENSATION AND $SO_2$ COPRODUCT

HIGH PRESSURE OXYGEN-BASED CLAUS ONE-STAGE SULFUR RECOVERY PROCESS WITH CONCURRENT SULFUR AND WATER CONDENSATION AND ACID GAS AND $H_2S$ RECYCLE

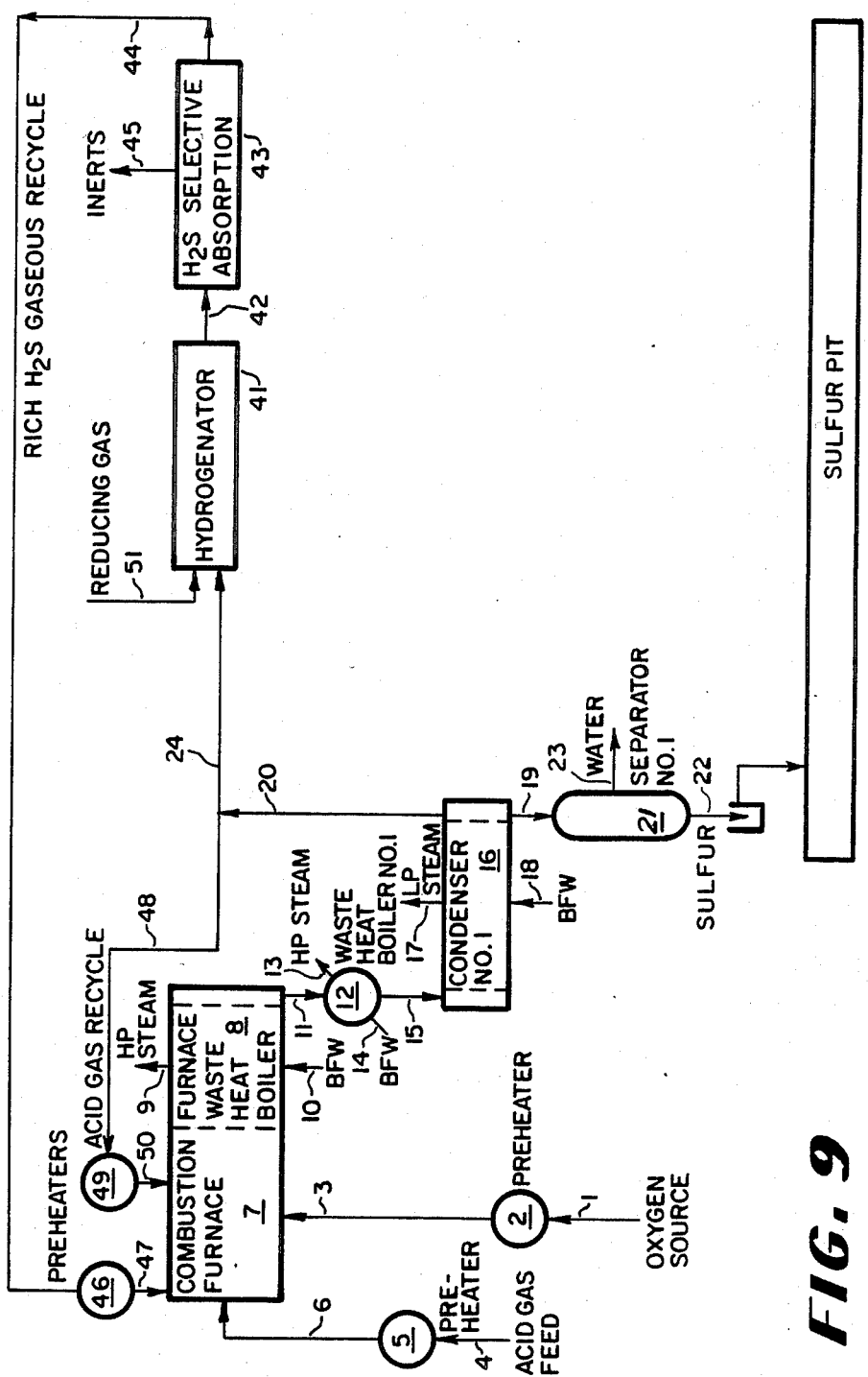

HIGH PRESSURE PROCESS FOR SULFUR RECOVERY FROM A HYDROGEN SULFIDE CONTAINING GAS STREAM

TECHNICAL FIELD

The present invention is directed to the recovery of sulfur from hydrogen sulfide-containing gas streams.

BACKGROUND OF THE INVENTION

Sour gas is a term applied to the products of natural gas wells which contain hydrogen sulfide ($H_2S$), or to tail gas streams from industrial sources such as the hydrodesulfurization or hydrotreating units of an oil refinery or synthetic gas manufacture; or to the untreated refinery fuel gas or wastewater stripper off-gas streams found in petroleum refineries.

Hydrogen sulfide must be removed from sour gas for environmental and safety reasons before such gases can be used or vented to the atmosphere. Usually sour gas containing $H_2S$ is passed into an absorption unit wherein the $H_2S$ is absorbed in a liquid. The liquid is then regenerated in a separate vessel to produce a mixture of gases at about atmospheric pressure. This mixture of gases is termed an acid gas. It is a gas containing $H_2S$, usualy greater than 30 volume percent, which may also contain substantial quantities of carbon dioxide and lesser amounts of water vapor, hydrocarbons, ammonia and other chemicals. Regenerator overhead gases from a fuel gas scrubbing process or a sour water stripper also may provide the $H_2S$ feeds (70 to 95 volume percent).

A conventional process for converting $H_2S$ in the acid gas to water vapor and elemental sulfur is a process generally known as the Claus process. This process is suitable for acid gas streams containing greater than 30 volume percent $H_2S$, since at lower $H_2S$ concentrations the combustion temperatures are difficult to adequately maintain with the conventional process. It is a low pressure process involving the following net reaction:

$$3 H_2S + 1.5 O_2 \rightarrow 3 H_2O + 1.5 S_2 \quad (1)$$

This reaction is usually accomplished in two stages in a reaction furnace. First, a portion, usually approximately one-third, of the $H_2S$ in the acid gas stream is reacted with air in a free-flame combustion furnace to produce $H_2S$ and $SO_2$ in a net ratio of 2:1. This reaction usually proceeds at temperatures from 1800° to 2900° F. and pressures from 20 to 30 psi, as follows:

$$H_2S + 1.5 O_2 \rightarrow H_2O + SO_2 \quad (2)$$

The remaining two-thirds of feed $H_2S$ is then reacted with the $SO_2$, that was produced by reaction (2) in the furnace, as follows:

$$2 H_2S + SO_2 \rightleftharpoons 2 H_2O + 1.5 S_2 \quad (3)$$

Reaction (2) is exothermic and irreversible. Reaction (3) is endothermic and reversible. Reaction (1) is the net reaction of reactions (2) and (3). Because of the reversible equilibrium limitation of reaction (3), the sulfur yield in the furnace is limited to about 50 to 70% depending upon the $H_2S$ feed concentration level.

The hot gas exiting the furnace is then cooled in a waste heat boiler ($\sim 700°$ F.) to generate high pressure steam and is further cooled in a sulfur condenser (260°–350° F.) where liquid sulfur is condensed and separated from the gas. The gas exiting the sulfur condenser is then fed to a series of two or three stages of reheat/catalytic Claus reaction/sulfur condensation in which the remainder of $H_2S$ and $SO_2$ is converted to sulfur and water vapor over catalyst beds of Bauxite or activated alumina according to the following reaction:

$$2 H_2S + SO_2 \rightleftharpoons 2 H_2O + 3/x S_x \quad (4)$$

where $X = 6$ to 8 @ $T = 500°–700°$ F. This reaction is exothermic and reversible.

The overall sulfur yield (recovery) is typically about 92–94% for a two-stage catalytic Claus reactor train and 97–98% for a three-stage train. The tail gas comprising unconverted $H_2S$, $SO_2$, sulfur vapor, $N_2$, $CO_2$, and $H_2O$ is either incinerated with fuel and air and then vented to atmosphere, or sent to a tail gas cleanup unit (TGCU) to reduce the sulfur emission in order to meet more stringent emission standards and to improve the overall sulfur recovery to about 99.8%. The cost of the front-end Claus combustion furnace section is only about 20% of the overall Claus plant cost, which includes the total Claus process plus a TGCU. The front-end Claus furnace section removes 50–70% of feed sulfur at 20% of the cost. The backend catalytic Claus converter train and the TGCU unit removes the remaining 30–50% at about 80% of the overall plant cost. This uneven cost distribution for sulfur recovery is an inherent problem in the present low pressure Claus process.

A basic problem with a low pressure Claus process as described above is the fact that the water vapor produced either from the combustion furnace or from subsequent catalytic Claus converters remains in the gas stream throughout the process, which seriously limits the sulfur conversion due to the reversible nature of the Claus reaction of either reaction (3) or reaction (4). This inherent low pressure limitation thus results in an incomplete sulfur recovery, and a large gas volumetric flowrate and equipment size resulting in increased capital and operating costs in the Claus plant, the tail gas cleanup unit and the incinerator.

Although the benefits of pressure on process efficiencies are known, operation of a Claus plant at elevated pressures has not been practiced commercially because of the compression cost associated with a large volume of air and to avoid liquid sulfur condensation in catalyst beds. The resultant problems are only partially resolved by using pure oxygen or $O_2$-enriched air as an oxidant source whereby the inert diluent $N_2$ is eliminated or reduced thereby increasing sulfur yield by increasing the partial pressure of the reacting gases. But the inherent limitation of high sulfur conversion remains the same because the water vapor produced from Claus reactions is still not removed.

Conditions are generally maintained in the conventional Claus converters so that temperatures never decrease below the dew point of sulfur vapor, and sulfur is prevented from condensing to liquid and plugging the catalyst beds. Sulfur is condensed at low pressure and removed from the sulfur condenser, and the process gases ($H_2S$ and $SO_2$) are reheated, usually by some suitable in-line heater, for further catalytic stages. Production of sulfur by reaction (4) is favored by a reduction of temperature.

Some prior art sub-dew point processes, such as in U.S. Pat. Nos. 3,702,884 and 3,749,762, for removing $H_2S$ from gas mixtures have used low temperature catalysts beds in which sulfur may be produced as a liquid. The processes are generally used in a TGCU of a Claus process for removal of the low level of sulfur compounds. These processes involve switching operation between beds to regenerate the catalyst beds wherein liquid sulfur is condensed from the Claus reaction. Again, water vapor is not condensed in the beds or in the condenser because of low pressure.

U.S. Pat. No. 2,200,928 teaches the use of a catalyst in Claus converters (248° to 842° F.) which absorbs some of the water formed by the Claus reaction. This will displace the equilibrium of reaction (3) to the right to improve the sulfur yield. The catalyst must be regenerated by heating and purging with dry gas to remove absorbed water.

U.S. Pat. No. 2,258,305 discloses a system of injecting air and $H_2S$-containing gas into an internal combustion engine and partially combusting $H_2S$ to form a gas containing S, $SO_2$, $N_2$, $H_2S$ and water. The exhaust is cooled to condense sulfur. The exhaust is further cooled to about ambient temperature to condense out water. The exhaust gas is then reheated to a temperature at which the Claus reaction takes place to form more sulfur. This process, however, suffers from the danger of solid sulfur plugging problems in the water removal step.

U.S. Pat. No. 2,298,641 teaches using an essentially dry feed gas and incorporating a drying agent in the catalyst bed to remove water. Another scheme for removing water involves the use of two catlyst converters. The feed gas containing a small amount of $H_2S$ is mixed with $O_2$ and is passed into the first converter. The effluent is cooled to condense sulfur and is then further cooled to remove water. The dried effluent is mixed with air and heated and passed into the second converter, and sulfur is recovered from the reaction gases. The use of a drying agent in the first scheme requires heat regeneration which is expensive. The second scheme suffers from the same problem of sulfur plugging as in U.S. Pat. No. 2,258,305.

U.S. Pat. No. 3,822,341 teaches the use of chilled water (32°–75° F.) to remove water in a liquid-vapor contactor. The inlet vapor sparger or pipe distributer is directly submerged in the chilled water pool and sulfur, easily solidified on the dry surface, may present plugging problems as in U.S. Pat. Nos. 2,258,305 and 2,298,641.

U.S. Pat. No. 4,426,369 teaches a Claus process under low temperatures and low water concentration conditions. The process treats a feed stream containing sulfur compounds by first converting all compounds in the stream to a single sulfur species (either to $H_2S$ by hydrogenation with $H_2$ or to $SO_2$ by oxidation with $O_2$), reducing water to below 10% by a water quench, creating a Claus reaction mixture, and then carrying out low temperature (below sulfur melting point) catalytic conversion to sulfur and additional water.

U.S. Pat. No. 4,289,990 discloses a high pressure (5 to 50 atmospheres absolute) Claus process called the Richard Sulfur Recovery Process (RSRP). The process involves introducing a compressed $H_2S$- and $SO_2$-containing stream from the Claus reaction furnace into a RSRP catalytic reactor. The gases are reacted in a catalyst bed in the reactor to produce elemental sulfur under appropriate temperature and pressure such that water in the RSRP reactor exists only as water vapor and sulfur vapor is condensed in the catalyst bed. The condensed sulfur is removed from the catalyst bed as a liquid. In this process water vapor is not condensed out with liquid sulfur so that the catalyst can remain effective and to eliminate potential corrosion resulting in the need for alloy steel in the process equipment.

U.S. Pat. No. 4,419,337 discloses another version of the RSRP process for generating $SO_2$ and $SO_3$ from sulfur or hydrogen sulfide by means of an oxidizing catalyst. This process replaces the conventional Claus reaction furnace with a RSRP oxidizer, which oxidizer is followed by the RSRP reactor described in U.S. Pat. No. 4,280,990. The oxidizing catalyst requires that water exist only as water vapor, and that the water not be condensed out with the liquid sulfur.

U.S. Pat. No. 4,138,473 teaches a modified Claus process by repressurizing the effluent gas stream from each sulfur condenser before entering the next catalytic Claus converter to improve the sulfur yield. In this process the condition is such that the water vapor is not condensed out with sulfur. The water vapor is condensed out only in a quench tower from the tail gas of the process in which all sulfur species are first oxidized with $O_2$ to $SO_2$. The dried $SO_2$ is then recycled to the front-end Claus furnace for further sulfur conversion.

U.S. Pat. No. 4,279,882 teaches the use of a catalytic Claus process called the Selectox process wherein the conventional thermal reactor, including its combustion chamber and waste heat boiler, is replaced by a catalytic selective oxidation reactor. There is no concurrent condensation of water and sulfur.

U.S. Pat. No. 4,302,434 teaches a hydrogenating desulfurisation process which produces liquid sulfur and gaseous hydrogen, and which utilizes a recycle of the remaining $H_2S$ process gas stream. The water vapor is condensed out only in a quench tower after hydrogenation.

BRIEF SUMMARY OF THE INVENTION

The present invention relates to an improved method of sulfur recovery from a hydrogen sulfide-containing gas stream. Water vapor produced by the Claus reactions is condensed concurrently with the sulfur vapor at a temperature above the sulfur melting point, followed by a separation of the water and sulfur. Increased operating pressure enhances benefits. Higher conversion in subsequent reaction steps, as a result of the removal of diluent and reaction product water, increases sulfur recovery. Sulfur plugging problems are avoided. Reduced process gas flowrates reduce the size, and therefore the cost, of equipment.

BRIEF DESCRIPTION OF THE DRAWINGS

FIG. 9 is a schematic diagram of an improved high pressure oxygen-based non-catalytic Claus sulfur recovery process with concurrent sulfur and water condensation and with rich H$_2$S recycle.

DETAILED DESCRIPTION OF THE INVENTION

The present invention is the provision of a sulfur recovery process with several important modifications and additions. These improvements can be applied to any sulfur recovery process including the conventional Claus process described above.

It is proposed to avoid sulfur plugging problems, to reduce the cost and size of equipment by reducing the process gas flowrate, to reduce the cost of tail gas treatment, to increase heat recovery, and to increase sulfur recovery from an H$_2$S-containing stream. All of the above objectives plus others apparent to one skilled in the art are attained through the condensation of the water vapor along with sulfur vapor at temperatures above the sulfur melting point ($\sim$248° F.) under sufficient high pressure. The operating pressure is preferably greater than 50 psia, and more preferably greater than 160 psia. The condensation step of the present invention can follow any of a variety of unit operations including, but not limited to, a Claus combustion furnace, a catalytic Claus converter, a Selectox-type catalytic reactor, a RSRP-type catalytic reactor, a RSRP-type catalytic oxidizer, a waste heat boiler, a sulfur condenser, a hydrogenator, or an SO$_2$ incinerator. Following the condensation step, the water contained in the water and sulfur condensate stream is easily separated from the sulfur as a separate phase. Operating the Claus process under high pressure such that water produced by the reactions (2), (3) and (4) set out above is substantially condensed out along with sulfur at temperatures above the sulfur melting point ($\sim$248° F.) results in removing the equilibrium limitation of the reactions, and permitting higher conversion in subsequent Claus reaction steps. The present invention applies either to the conventional Claus process configuration, variations of the conventional Claus process, or to other classes of process configurations some of which will be disclosed following. The instant invention also applies to processing using air, O$_2$-enriched air or pure oxygen as a source of oxidant. In each of the following cases, results of the computer process simulation demonstrate the advantages of high pressure operation to condense water out along with sulfur.

Figure 1:
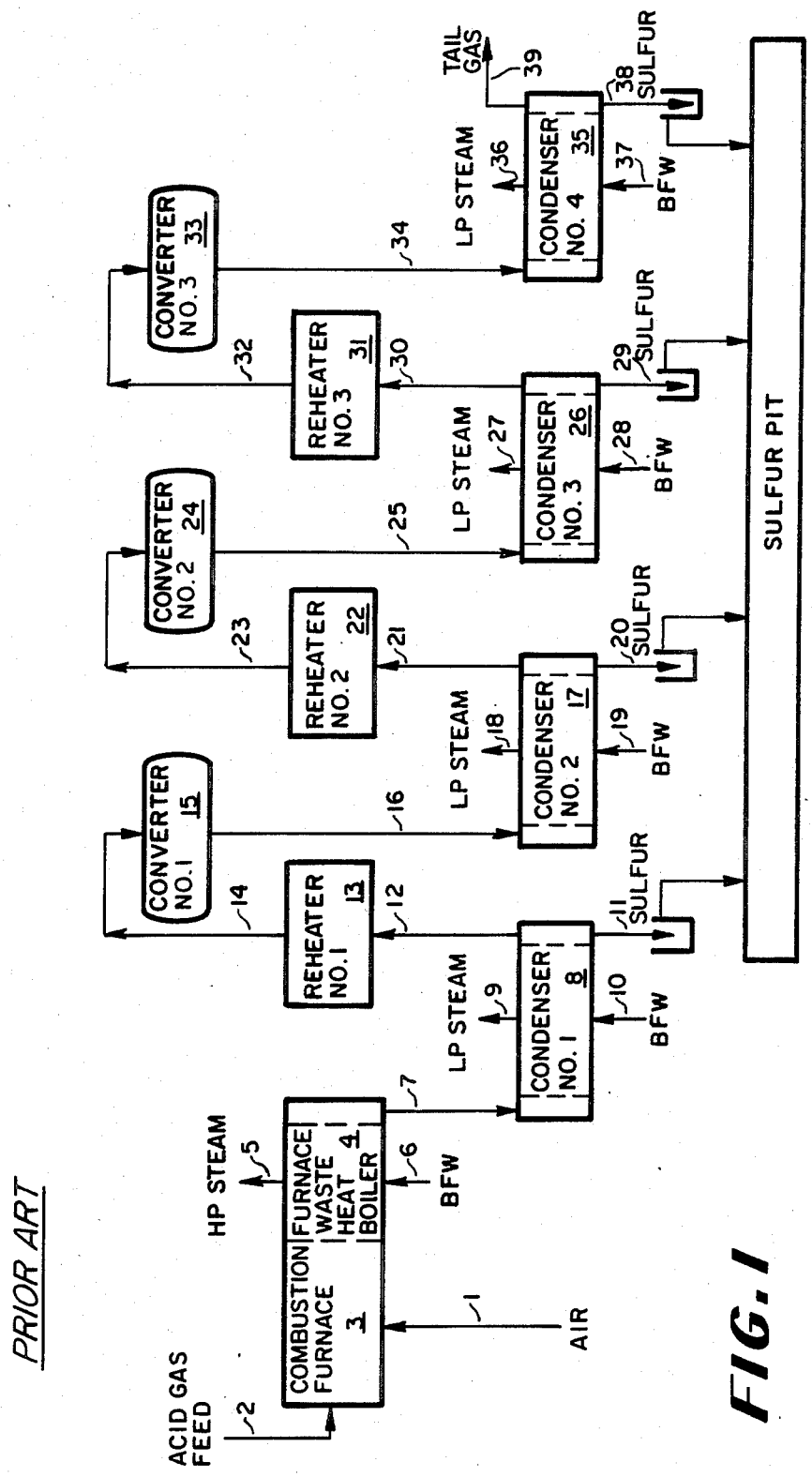
FIG. 1 is a schematic diagram of a conventional catalytic Claus three-stage sulfur recovery process.

FIG. 1 shows the conventional Claus three-stage sulfur recovery process which includes a combustion furnace, a waste heat boiler, and a sulfur condenser followed by a 3-stage converter train comprising a reheater, a catalytic converter, and a sulfur condenser.

In the conventional Claus process, air 1 and acid gas feed 2 enter the combustion furnace 3. The furnace product gases cooled in a furnace waste heat boiler 4, which boiler produces high pressure steam 5 from boiler feed water (BFW) 6. The cooled gases 7 are further cooled in the first condenser 8, which condenser produces low pressure steam 9 from boiler feed water 10. In the first condenser 8, liquid sulfur 11 is condensed out and the cold gases 12 are further processed in a series of stages.

FIG. 1, for example, shows three stages. Each stage consists of a reheater, a converter, and sulfur condenser. The number of stages, usually three, varies depending upon desired sulfur recovery, economic considerations, etc.

The first stage in FIG. 1 consists of the first reheater, the first converter, and the second condenser. The cold process gas stream 12 from the first condenser 8 is heated in the first reheater 13. The heated process gas stream 14 is reacted in the first catalytic converter 15. The converted process gas stream 16 is cooled in the second condenser 17, which condenser produces low pressure steam 18 from the boiler feed water 19. In the second condenser 17, liquid sulfur 20 is condensed out and the cold gas stream 21 is further processed.

The second stage in FIG. 1 consists of the second reheater, the second converter, and the third condenser. The cold process gas stream 21 from the second condenser 17 is heated in the second reheater 22. The heater process gas stream 23 is reacted in the second catalytic converter 24. The converted process gas stream 25 is cooled in the third condenser 26, which condenser produces low pressure stream 27 from the boiler feed water 28. In the third condenser 26, liquid sulfur 29 is condensed out and the cold gas stream 30 is further processed.

The third stage in FIG. 1 consists of the third reheater, the third converter, and the fourth condenser. The cold process gas stream 30 from the third condenser 26 is heated in the third reheater 31. The heated process gas stream 32 is reacted in the third catalytic converter 33. The converted process gas stream 34 is cooled in the fourth condenser 35, which condenser produces low pressure steam 36 from the boiler feed water 37. In the fourth condenser 35, liquid sulfur 38 is condensed out and the remaining tail gas stream 39 is further processed.

Figure 2:
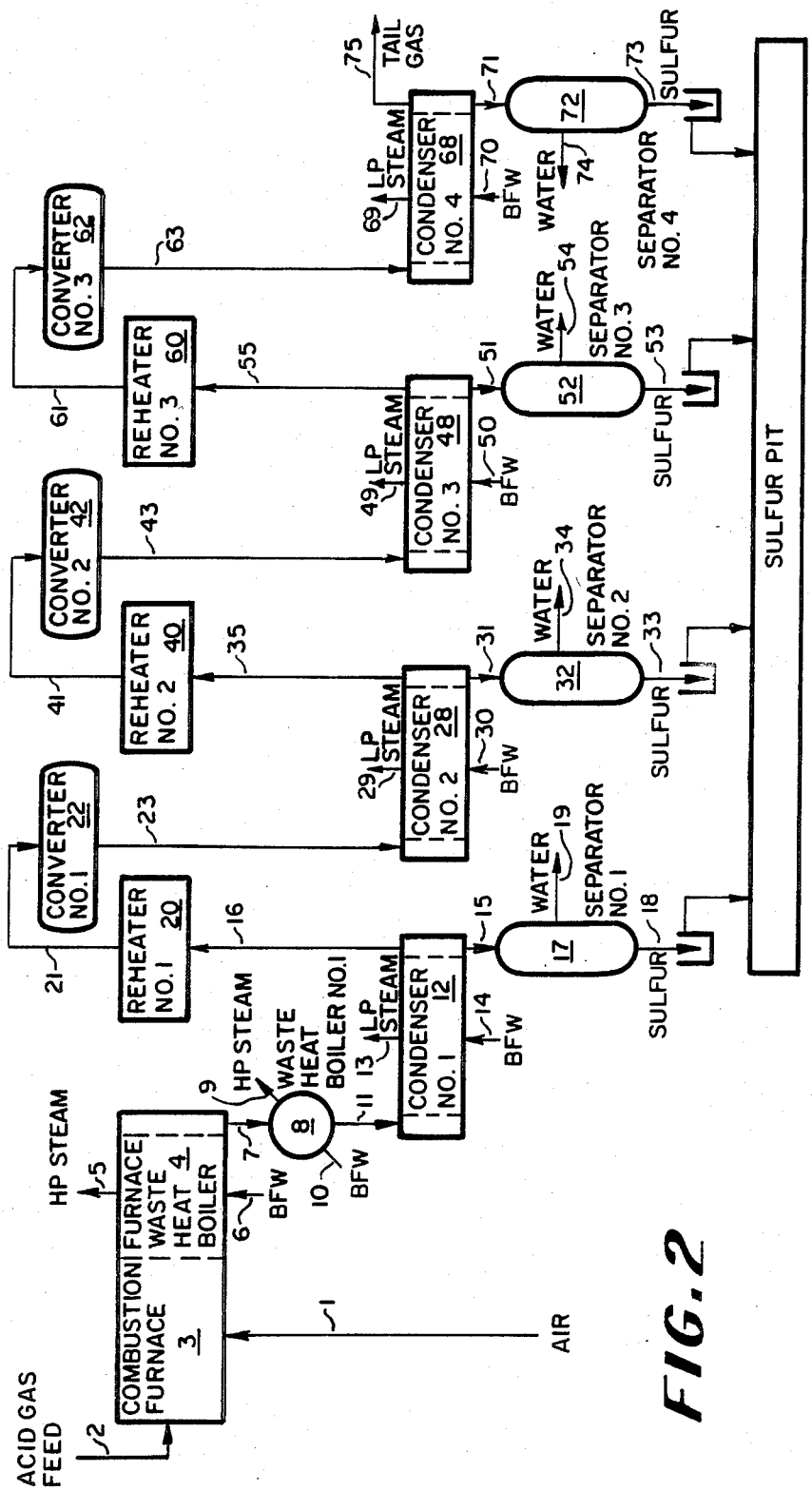
FIG. 2 is a schematic diagram of an improved high pressure catalytic Claus three-stage sulfur recovery process with concurrent sulfur and water condensation in accordance with the present invention.

FIG. 2 shows a high pressure Claus process wherein the Claus combustion furnace section is followed by a three-stage catalytic Claus converter train similar to FIG. 1 except that each sulfur condenser is replaced by a sulfur/water condenser, and a separator to separate water and sulfur condensates.

In FIG. 2, air 1 and acid gas feed 2 enter the combustion furnace 3. The furnace product gases are cooled in a furnace waste heat boiler 4, which boiler produces high pressure steam 5 from boiler feed water 6. The cooled gases 7 are further cooled in the first waste heat boiler 8, which boiler produces high pressure stream 9 from boiler feed water 10. The cooled gases 11 are further cooled in the first condenser 12, which condenser produces low pressure steam 13 from boiler feed water 14. In the first condenser 12, a liquid sulfur and water stream 15 is condensed out and the cold gases 16 are further processed in a series of stages. The condensed liquid stream 15 is divided in the first separator 17 into a liquid sulfur stream 18 and a liquid water stream 19.

FIG. 2, for example, shows three stages. Each stage consists of a reheater, a converter, a sulfur/water condenser, and a separator.

The first stage in FIG. 2 consists of the first reheater, the first converter, the second condenser and the second separator. The cold process gas stream 16 from the first condenser 12 is heated in the first reheater 20. The heated process gas stream 21 is reacted in the first catalytic converter 22. The converted process gas stream 23 is cooled in the second condenser 28, which condenser produces low pressure steam 29 from the boiler feed water 30. In the second condenser 28, liquid sulfur and water 31 are condensed out and the cold gas stream 35 is further processed. The liquid sulfur and water stream 31 is divided in the second separate 32 into a liquid sulfur stream 33 and a liquid water stream 34.

The second stage in FIG. 2 consists of the second reheater, the second converter, the third condenser, and the third separator. The cold process gas stream 35 from the second condenser 28 is heated in the second reheater 40. The heated process gas stream 41 is reacted in the second catalytic converter 42. The converted process gas stream 43 is cooled in the third condenser 48, which condenser produces low pressure steam 49 from the boiler feed water 50. In the third condenser 48, liquid sulfur and water 51 are condensed out and the cold gas stream 55 is further processed. The liquid sulfur and water stream 51 is divided in the third separator 52 into a liquid sulfur stream 53 and a liquid water stream 54.

The third stage in FIG. 2 consists of the third reheater, the third converter, the fourth condenser, and the fourth separator. The cold process gas stream 55 from the third condenser 48 is heated in the third reheater 60. The heated process gas stream 61 is reacted in the third catalytic converter 62. The converted process gas stream 63 is cooled in the fourth condenser 68, which condenser produces low pressure steam 69 from the boiler feed water 70. In the fourth condenser 68, liquid sulfur and water 71 are condensed out and the remaining tail gas stream 75 is further processed. The liquid sulfur and water stream 71 is divided in the fourth separator 72 into a liquid sulfur stream 73 and a liquid water stream 74.

The number of Claus catalytic converter stages is not a key factor of the present invention since concurrent water and sulfur condensation can be employed to advantage in whatever number of stages are present. The condenser and the separator can be combined or designed in any convenient manner known to one skilled in the art.

Table 1 below demonstrates the effects of pressure at various acid gas feed $H_2S$ concentration on the sulfur recovery and flowrate. Table 1 has example process conditions for the three $H_2S$ feed concentrations of 92%, 74% and 50% (all molar percent) and for air feed. Each $H_2S$ feed concentration shows example process conditions at the low, mid and high pressures of 25.7 psia, 80 or 120 psia, and 240 psia. The low pressure (25.7 psia) runs are at typical conditions for the Claus sulfur plant shown in FIG. 1. The mid (80 or 120 psia) and high (240 psia) pressure runs illustrate the reduction in process flowrate and the increase in overall sulfur recovery for the improved Claus sulfur plant shown in FIG. 2.

TABLE 1

AIR-BASED EXAMPLES FOR THREE FEED COMPOSITIONS AT LOW, MID, AND HIGH PRESSURES

| | FEED | | | | | | | | |
|---|---|---|---|---|---|---|---|---|---|
| | 92% Feed $H_2S$ | | | 73% Feed $H_2S$ | | | 50% Feed $H_2S$ | | |
| Run No. | A-1 Low Pressure | A-2 Mid Pressure | A-3 High Pressure | B-1 Low Pressure | B-2 Mid Pressure | B-3 High Pressure | C-1 Low Pressure | C-2 Mid Pressure | C-3 High Pressure |
| Waste Heat Boiler/First Condenser | | | | | | | | | |
| Furnace Inlet Pressure, psia | 25.7 | 80 | 240 | 25.7 | 120 | 240 | 25.7 | 120 | 240 |
| Furnace Outlet Temperature, °F. | 2186 | 2291 | 2349 | 2145 | 2232 | 2269 | 1782 | 1846 | 1873.5 |
| Sulfur Conversion, % | 71.4 | 69.3 | 65.3 | 71.4 | 66 | 63.6 | 66.5 | 60.9 | 53.4 |
| Water Condensed, mole/mole $H_2S$ Feed | 0 | 0 | 0.34 | 0 | 0 | 0.30 | 0 | 0 | 0.24 |
| Oxygen Requirements, mole/mole $H_2S$ Feed | 0.46 | 0.47 | 0.48 | 0.53 | 0.55 | 0.56 | 0.49 | 0.50 | 0.50 |
| Total Furnace Inlet Flow acfm/(acfm of Run No. 1) | 1.00 | 0.32 | 0.11 | 1.00 | 0.22 | 0.11 | 1.00 | 0.22 | 0.11 |
| Condenser Outlet Flow, acfm/(acfm of Run No. 1) | 1.00 | 0.26 | 0.08 | 1.00 | 0.18 | 0.08 | 1.00 | 0.20 | 0.10 |
| First Converter/Second Condenser | | | | | | | | | |
| Converter Inlet Temperature, °F. | 430 | 430 | 500 | 430 | 500 | 500 | 450 | 500 | 500 |
| Converter Outlet Temperature, °F. | 561 | 581 | 684.5 | 541 | 622.6 | 651 | 559.4 | 624.4 | 646.7 |
| Dew Point, °F. (sulfur) | 472 | 561 | 654.1 | 465.1 | 570.7 | 640.5 | 464.6 | 576 | 643.2 |
| Sulfur Conversion, % | 93.1 | 91.8 | 93.3 | 93.7 | 92.0 | 93.3 | 92.4 | 91.4 | 92.7 |
| Water Condensed, mole/mole $H_2S$ Feed | 0 | 0 | 0.58 | 0 | 0 | 0.56 | 0 | 0 | 0.53 |
| Converter Inlet Gas Flow, acfm/(acfm of Run No. 1) | 1.00 | 0.31 | 0.09 | 1.00 | 0.22 | 0.10 | 1.00 | 0.20 | 0.10 |
| Second Converter/Third Condenser | | | | | | | | | |
| Converter Inlet Temperature, °F. | 420 | 500 | 500 | 420 | 500 | 500 | 525 | 500 | 500 |
| Converter Outlet Temperature, °F. | 448.8 | 530.7 | 541.2 | 440.7 | 523.6 | 529.1 | 536.8 | 522.4 | 526.9 |
| Dew Point, °F. (Sulfur) | 400 | 454.3 | 539.8 | 389.5 | 464.0 | 517.8 | 349.4 | 464.2 | 516.4 |
| Sulfur Conversion, % | 97.5 | 96.6 | 98.4 | 97.6 | 96.7 | 98.2 | 95.2 | 96.5 | 98.0 |
| Water Condensed, mole/mole $H_2S$ Feed | 0 | 0 | 0.62 | 0 | 0 | 0.60 | 0 | 0 | 0.58 |
| Converter Inlet Gas Flow, acfm/(acfm of Run No. 1) | 1.00 | 0.30 | 0.08 | 1.00 | 0.20 | 0.09 | 1.00 | 0.20 | 0.09 |
| Third/Fourth Condenser | | | | | | | | | |
| Converter Inlet Temperature, °F. | 400 | 500 | 500 | 400 | 500 | 500 | 450 | 500 | 500 |
| Converter Outlet Temperature, °F. | 406 | 507 | 506 | 404.5 | 504.9 | 504.3 | 453 | 504.4 | 503.9 |
| Dew Point, °F. (Sulfur) | 351.5 | 375 | 445 | 344.7 | 379.4 | 403.7 | 312.7 | 377 | 400.9 |
| Sulfur Conversion, % | 98.5 | 97.6 | 99.1 | 98.5 | 97.6 | 98.9 | 97.8 | 97.5 | 98.8 |

TABLE 1-continued

AIR-BASED EXAMPLES FOR THREE FEED COMPOSITIONS
AT LOW, MID, AND HIGH PRESSURES

| | FEED | | | | | | | | |
|---|---|---|---|---|---|---|---|---|---|
| | 92% Feed $H_2S$ | | | 73% Feed $H_2S$ | | | 50% Feed $H_2S$ | | |
| Run No. | A-1 Low Pressure | A-2 Mid Pressure | A-3 High Pressure | B-1 Low Pressure | B-2 Mid Pressure | B-3 High Pressure | C-1 Low Pressure | C-2 Mid Pressure | C-3 High Pressure |
| Water Condensed, mole/mole $H_2S$ Feed | 0 | 0 | 0.63 | 0 | 0 | 0.60 | 0 | 0 | 0.58 |
| Converter Inlet Gas Flow, acfm/(acfm of Run No. 1) | 1.00 | 0.28 | 0.07 | 1.00 | 0.19 | 0.08 | 1.00 | 0.20 | 0.09 |

First, consider three runs of 92% $H_2S$ feed. Run A-1 operates at a feed pressure of 25.7 psia which is a typical low pressure for a Claus sulfur recovery plant. Run A-2 operates at 80 psia and Run A-3 operates at 240 psia. The overall sulfur conversion of Run A-1 is 98.5% and no water is condensed because the dew point of water vapor throughout the process is lower than the condenser temperature (260° F.). As the pressure is increased to 80 psi in Run A-2, the overall sulfur conversion is decreased to 97.6% and water is still not condensed out because the water dew point is still too low. The reason for this reduced overall sulfur conversion is that the increased pressure has an adverse effect on the Claus reaction (3) at high temperature. Equilibrium is displaced to the left, according to the Le Chatelier's principle, when 3 moles of reactants are converted into 3.5 moles of products. Increased pressure has a positive effect on the conversion of Claus reaction (4) at converter temperatures (450°-700° F.) where 3 moles of reactants is converted into 2.3 to 2.5 moles of products. However, the net effect of increased pressure is such that the overall sulfur yield of Run A-2 is lower than that of Run A-1. the volumetric flowrate of Run A-2 is about one third that of Run A-1 which, therefore, requires a smaller plant size. This is one apparent advantage of operating at increased pressures.

In Run A-3, the operating pressure is increased to 240 psia, at which pressure water is condensed out with liquid sulfur at 260° F. (above the 248° F. of sulfur melting point). Consequently, despite the adverse effect of pressure on the Claus reaction furnace conversion (65% v. 71% of Run A-1), the water removal in condensers increases the sulfur yield in subsequent catalytic Claus converters. The overall sulfur yield of Run A-3, thus, increases to 99.1% which exceeds the 98.5% of Run A-1. This is an unexpected result. Furthermore, the volumetric flowrate of the tail gas is only 7% of that low pressure Run A-1 and the plant size is dramatically reduced because about 63% of water vapor from the Claus reaction is condensed in the separators rather than exiting in the tail gas stream. At the same time more heat is recovered in the form of steam.

Similar results are observed from Runs B-1 to B-3 for a 73% $H_2S$ feed and Runs C-1 to C-3 for a 50% $H_2S$ feed. That is, at sufficient high pressure which causes water to condense out along with sulfur, the overall sulfur yield is substantially increased and the required plant size is substantially decreased.

The combination of elevated pressure and removal of water concurrently with the sulfur avoids sulfur plugging problems, increases sulfur recovery, and reduces equipment costs. Additionally, condensation of the water results in an increased heat recovery in the form of steam.

It is within the scope of the present invention to utilize a hybrid dual pressure Claus process wherein the low pressure front-end furnace section is followed by a compression stage to condense additional water and a high pressure backend catalytic converter train. This hybrid process will have an even higher overall sulfur yield; additionally compression power requirement are reduced because less gas needs to be compressed after sulfur and water are condensed in the first sulfur condenser of the front-end furnace section.

It is known that oxygen enrichment can increase the capacity of $H_2S$ handling as well as the total throughput of the Claus plant as set forth in the article *$O_2$ Use In the Sulfur Plants* by M. R. Gray and W. Y. Svreck published in the 1981 Gas Conditioning Conference Report (Norman, Okla. Mar. 2-4, 1981). Use of pure $O_2$ or $O_2$-enriched air results in a very high overall sulfur recovery and smaller plant size. A portion of the steam produced is sufficient to drive the compressors required for air separation, $H_2S$ fed gas compression, and $O_2$ compression. Also $N_2$ is recovered as a byproduct from the air separation plant.

There is a limitation, however, on the degree of $O_2$-enrichment because the maximum temperature of furnace refractory is limited to about 2900°-3100° F. To overcome this difficulty in taking full advantage of using pure oxygen in the Claus process, the following techniques were recently suggested:

Temperature moderation of an $O_2$-enriched Claus sulfur recovery plant with acid gas recycle.

Temperature moderation of an $O_2$-enriched Claus sulfur recovery plant with water.

Temperature moderation of an $O_2$-enriched Claus sulfur recovery plant with sulfur recycle.

Temperature moderation of an $O_2$-enriched Claus sulfur with spent sulfur acid.

These techniques are aimed at controlling the furnace temperature while reducing the gas flow rate by excluding the nitrogen diluent. However, water vapor is not condensed out at low pressures in the processes.

A further technique for operation of a Claus furnace at high temperatures with $O_2$-enriched air is to use a water-cooled metal rocket motor type combustor similar to that used in the high-temperature pyrolysis acetylene process known in the prior art. In this type of combustor, no refractory is used and the metal temperature is maintained at a low, safe level by water cooling while flame temperature can reach a very high level.

Figure 3:
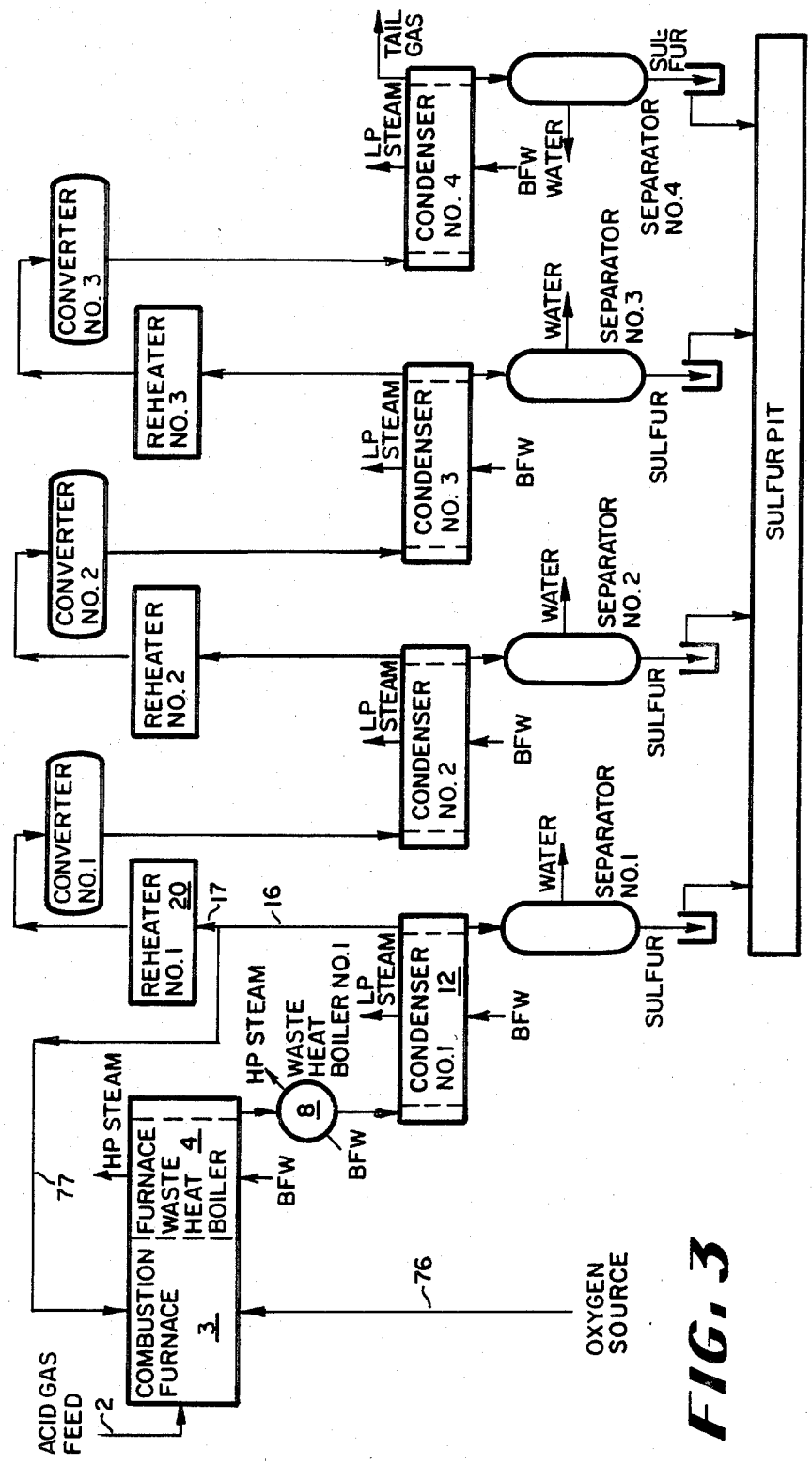
FIG. 3 is a schematic diagram of the process of FIG. 2 that is oxygen-based with concurrent sulfur and water condensation and with acid gas recycle.
Figure 4:
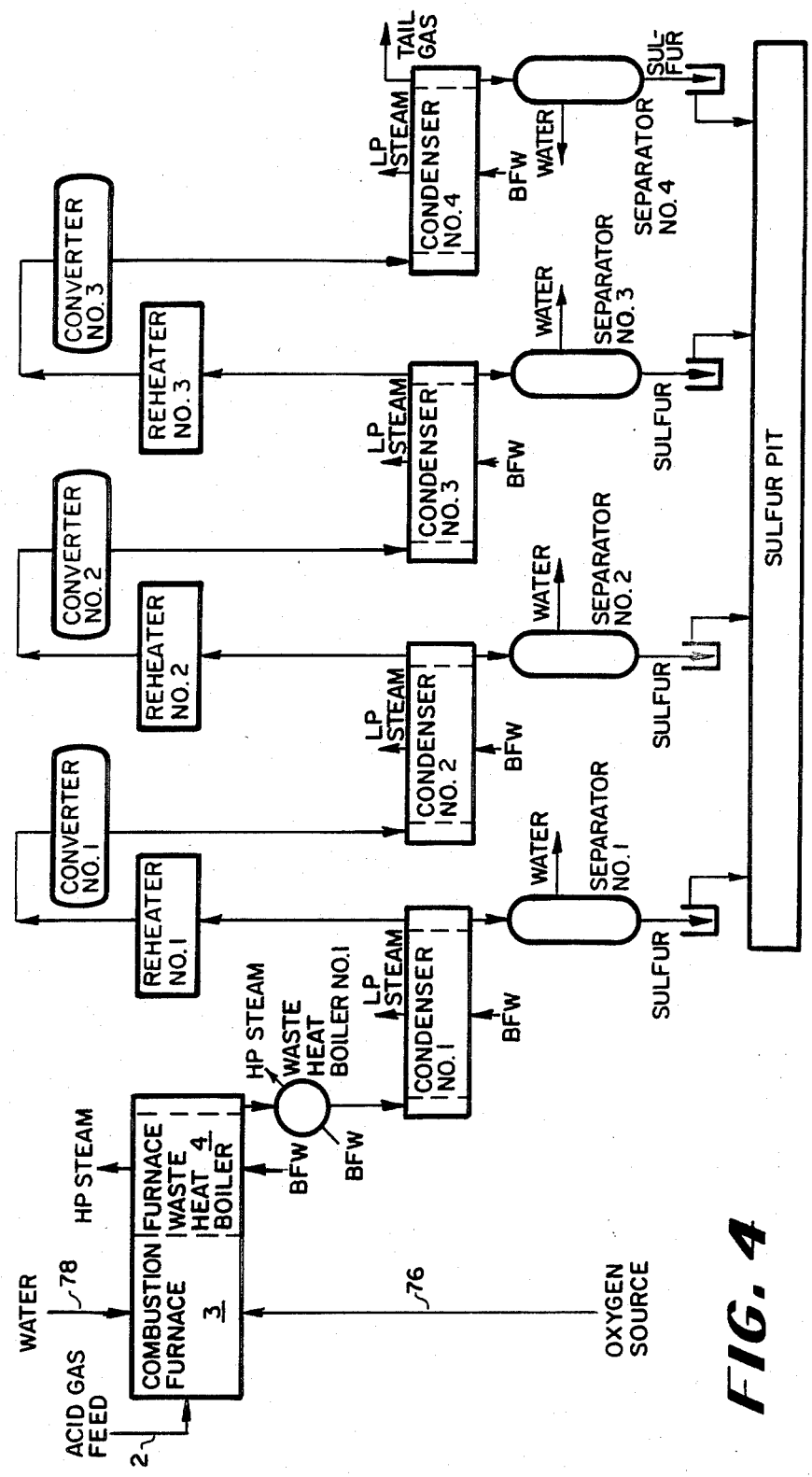
FIG. 4 is a schematic diagram of the process of FIG. 2 that is oxygen-based with concurrent sulfur and water condensation and with liquid water injection.
Figure 5:
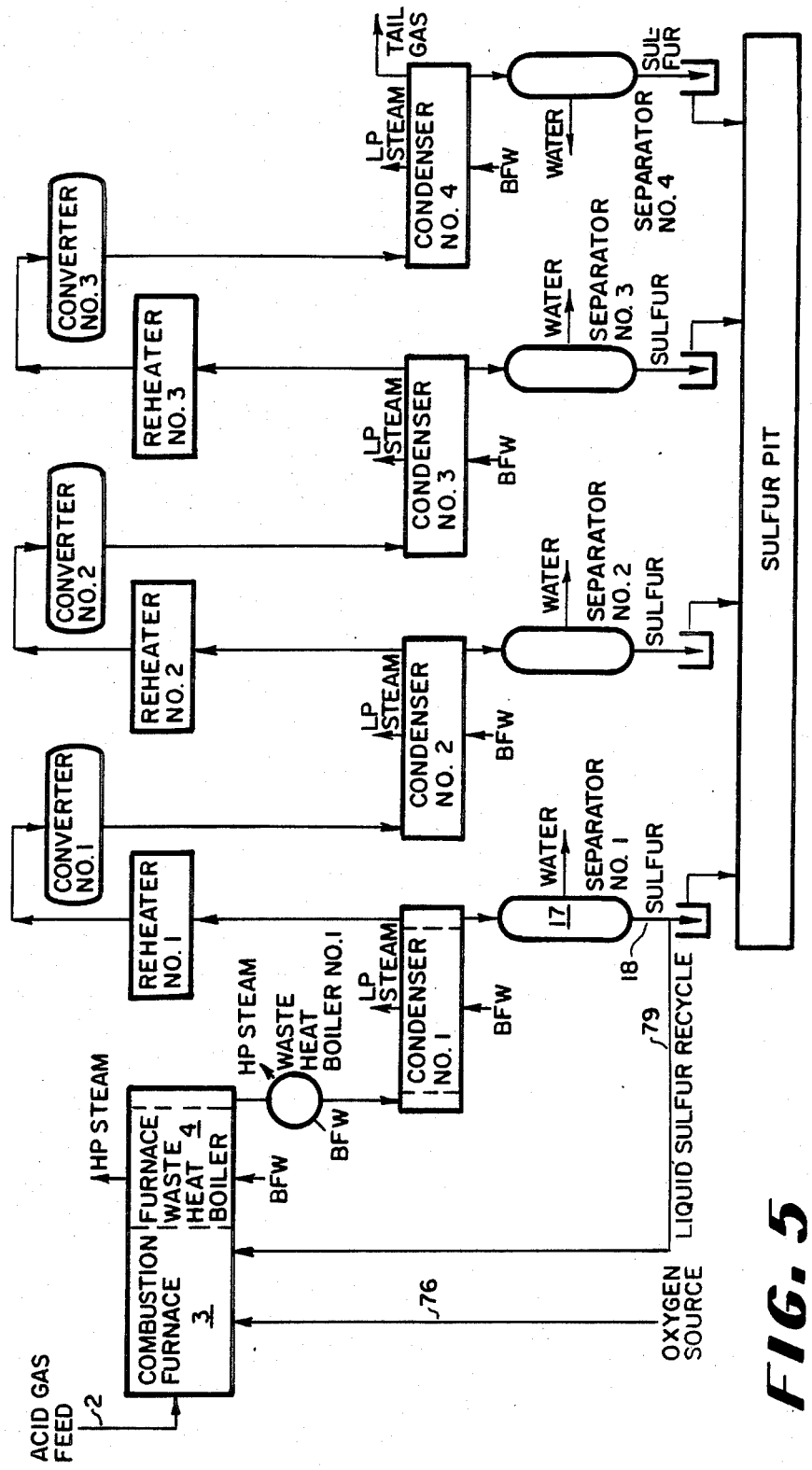
FIG. 5 is a schematic diagram of the process of FIG. 2 that is oxygen-based with concurrent sulfur and water condensation and with liquid sulfur recycle.

These five temperature modification techniques for $O_2$-enriched processes, as well as other techniques known to one skilled in the art, can be improved by application of the present invention. Refer to FIGS. 3, 4 and 5 for the flow diagrams of the first three of the above-mentioned temperature moderation techniques respectively. The results of process simulation are displayed in Table 2. Note that two air-based Claus process runs A-1 and A-3 from Table 1 are included here for comparison.

FIG. 3 is similar to FIG. 2 except that the air 1 to the combustion furnace 3 is replaced by an oxygen source 76 and that an additional acid gas recycle stream 77 is

TABLE 2

COMPARISON OF AIR-BASED PROCESSES TO
OXYGEN-BASED PROCESSES AT VARIOUS PRESSURES
FEED: 92% H$_2$S, 409 lb mole/hr

|  | Air-Based | | O$_2$-Based Acid Gas Recycle | | | |
|---|---|---|---|---|---|---|
|  | | | (W/O Front-End Preheat) | | (W/Front-End Preheat) | |
| Run No. | A-1 | A-3 | R-1 | R-2 | R-3 | R-4 |
| Reaction Furnace/Waste Heat Boiler/ | | | | | | |
| First Condenser | | | | | | |
| Furnace Inlet Pressure, psia | 25.7 | 240 | 25.7 | 80 | 80 | 160 |
| Furnace Outlet Temperature, °F. | 2186 | 2349 | 2186 | 2291 | 2230 | 2231 |
| Sulfur Conversion, % | 71.4 | 65.3 | 77.8 | 90.1 | 95.1 | 98.0 |
| Water Condensed, lb mole/hr | 0 | 127.5 | 0 | 304.4 | 342.3 | 381.5 |
| Total Furnace Inlet Flow, | | | | | | |
| acfm | 4903.8 | 519.3 | 6399.5 | 1766.9 | 4258.1 | 2079.7 |
| lb mole/hr | 1264.4 | 1263.9 | 1235.7 | 1224.7 | 1626.5 | 1599.8 |
| Condenser Outlet Flow, lb mole/hr | 1269 | 1011 | 445 | 123 | 75.3 | 30.3 |
| First Converter/Second Condenser | | | | | | |
| Converter Inlet Gas Flow, acfm | 7744 | 723.8 | 3027.3 | 249.0 | 152.0 | 30.1 |
| Converter Outlet Temperature, °F. | 561 | 684.5 | 623 | 744.4 | 698.5 | 713.6 |
| Sulfur Conversion, % | 93.1 | 93.3 | 92.2 | 97.1 | 98.6 | 99.6 |
| Water Condensed, lb mole/hr | 0 | 218.2 | 0 | 344.0 | 361.9 | 387.3 |
| Second Converter/Third Condenser | | | | | | |
| Converter Inlet Gas Flow, acfm | 8059 | 635.1 | 3096.0 | 152.7 | 114.8 | 24.5 |
| Converter Outlet Temperature, °F. | 448.8 | 541.2 | 493.5 | 600.3 | 603.8 | 573.5 |
| Sulfur Conversion, % | 97.5 | 98.4 | 97.2 | 99.3 | 99.6 | 99.9 |
| Water Condensed, lb mole/hr | 0 | 234.7 | 0 | 356.2 | 366.3 | 388.3 |
| Third Converter/Fourth Condenser | | | | | | |
| Converter Inlet Gas Flow, acfm | 8874 | 618.9 | 3235.6 | * | —* | * |
| Converter Outlet Temperature, °F. | 406 | 506 | 422.8 | | | |
| Sulfur Conversion, % | 98.5 | 99.1 | 98.6 | | | |
| Water Condensed, lb mole/hr | 0 | 237.0 | 0 | | | |

|  | O$_2$-Based Water Injection | | O$_2$-Based Liquid Sulfur Recycle | |
|---|---|---|---|---|
| Run No. | W-1 | W-2 | S-1 | S-2 |
| Reaction Furnace/Waste Heat Boiler/ | | | | |
| First Condenser | | | | |
| Furnace Inlet Pressure, psia | 25.7 | 80 | 25.7 | 80 |
| Furnace Outlet Temperature °F. | 2197 | 2291 | 2186 | 2277 |
| Sulfur Conversion, % | 60.8 | 56.1 | 58.6 | 54.6 |
| Water Condensed, lb mole/hr | 0 | 51.6 | 0 | 70.4 |
| Total Furnace Inlet Flow, | | | | |
| acfm | 3676.0 | 1272.8 | 3676.0 | 1171.0 |
| lb mole/hr | 855.3 | 831.1 | 642.6 | 634.6 |
| Condenser Outlet Flow, lb mole/hr | 739 | 418.1 | 468 | 401 |
| First Converter/Second Condenser | | | | |
| Converter Inlet Gas Flow, acfm | 5022.9 | 846.5 | 3183.4 | 783.3 |
| Converter Outlet Temperature, °F. | 633 | 809 | 737.2 | 811.7 |
| Sulfur Conversion, % | 86.1 | 85.7 | 84.9 | 85.7 |
| Water Condensed, lb mole/hr | 0 | 215.6 | 0 | 247.9 |
| Second Converter/Third Condenser | | | | |
| Converter Inlet Gas Flow, acfm | 5124.5 | 444.6 | 3151.1 | 369.1 |
| Converter Outlet Temperature, °F. | 499.8 | 699 | 562.3 | 721.2 |
| Sulfur Conversion, % | 94.9 | 96.0 | 94.9 | 96.0 |
| Water Condensed, lb mole/hr | 0 | 273.4 | 0 | 306.5 |
| Third Converter/Fourth Condenser | | | | |
| Converter Inlet Gas Flow, acfm | 5349.5 | 319.1 | 3244.7 | 246.3 |
| Converter Outlet Temperature, °F. | 425 | 575 | 449.4 | 606.5 |
| Sulfur Conversion, % | 97.6 | 98.9 | 98.1 | 98.9 |
| Water Condensed, lb mole/hr | 0 | 287.6 | 0 | 321.5 |

*Third catalytic Claus stage is not required.

Generally, the Claus process utilizes air as the oxygen source. It is known that, with appropriate modifications to control the resulting higher flame temperatures, the air can be replaced by oxygen-enriched air or pure oxygen.

FIGS. 3, 4 and 5 illustrate the application of the present invention to O$_2$-based or O$_2$-enriched air processes. Discussion of process simulation results for each configuration follow a brief description of each process.

divided from stream 16 and enters the combustion furnace 3 for the purpose of moderating temperature. The acid gas recycle stream 77 provides for additional sulfur conversion in the present invention wherein the water content of stream 16 is substantially reduced.

FIG. 4 is similar to FIG. 2 expect that the air 1 to the combustion furnace 3 is replaced by an oxygen source 76 and that liquid water 78 is injected into the combustion furnace 3 for the purpose of moderating temperature.

FIG. 5 is similar to FIG. 2 except that the air 1 to the combustion furnace 3 is replaced by an oxygen source 76 and that an additional sulfur recycle stream 79 is divided from stream 18 and enters the combustion furnace 3 for the purpose of moderating temperature.

First, note in Table 2 the $O_2$-enriched acid gas recycle results. Run R-1 at 25.7 psia shows a 98.6% overall sulfur recovery, similar to the air-based Run A-1 with a substantial molar flow reduction (>60%) in the outlet flow to the catalytic Claus converter train though the volumetric flow into the front-end furnace is increased by 31% due to gas recycle. By increasing the pressure from 25.7 psia to 80 psia, Run R-2 shows a dramatic improvement over the low pressure Run R-1. An overall sulfur recovery of 99.3% is achieved by using only two small backend catalytic Claus reactors, rather than three large ones. Also, volumetric gas flow reductions of 72% in the furnace section and 92-95% in the catalytic section are achieved. The third catalytic Claus stage is not required.

Run R-3 shows that if the combined furnace inlet gas is preheated to about 700° F. and allowed to recycle more gas, the overall sulfur recovery is further increased to 99.6% and the tail gas is further reduced. Again the third catalytic Claus stage is not required. By increasing the pressure further to 160 psia in Run R-4, the overall sulfur recovery is 99.9%. In fact the furnace section alone achieves 98% sulfur recovery and the catalytic section, as well as the costly TGCU, can be eliminated. This results in a very simple, compact and yet very efficient sulfur recovery process. This unexpected result is not suggested by any other known prior art low pressure Claus processes, such as that disclosed in '433, wherein water is not removed in the recycle gas.

Secondly, furnace temperature can be controlled through water injection to reduce the reaction furnace inlet gas flowrate as shown in FIG. 4. Comparison of Run W-1 with Run R-1 shows a flow reduction of 43%. However, the sulfur recovery is reduced from 98.6% to 97.6% with a concurrent flow increase of 65% in the backend because water injected into the furnace remains in the process, and has an adverse effect on the Claus reaction as explained previously. This difficulty is easily overcome by operating at high pressure such as 80 psia for Run W-2 with concurrent condensation of water such that sulfur recovery is increased. The overall recovery is 98.9%, greater than Run R-1, yet both front-end and backend flowrates are reduced substantially.

Thirdly, product liquid sulfur can be recycled to the reaction furnace. Effects similar to the water-injection scheme results are shown in Runs S-1 and S-2 of Table 2. At low pressure (25.7 psia), Run S-1 shows a much lower molar flowrate through the backend process than that of Run W-1. At high pressure (80 psia), Run S-2 shows the advantages of further flow reduction and of higher sulfur recovery when water vapor is condensed concurrently with the sulfur and is removed from the process gas.

Figure 6:
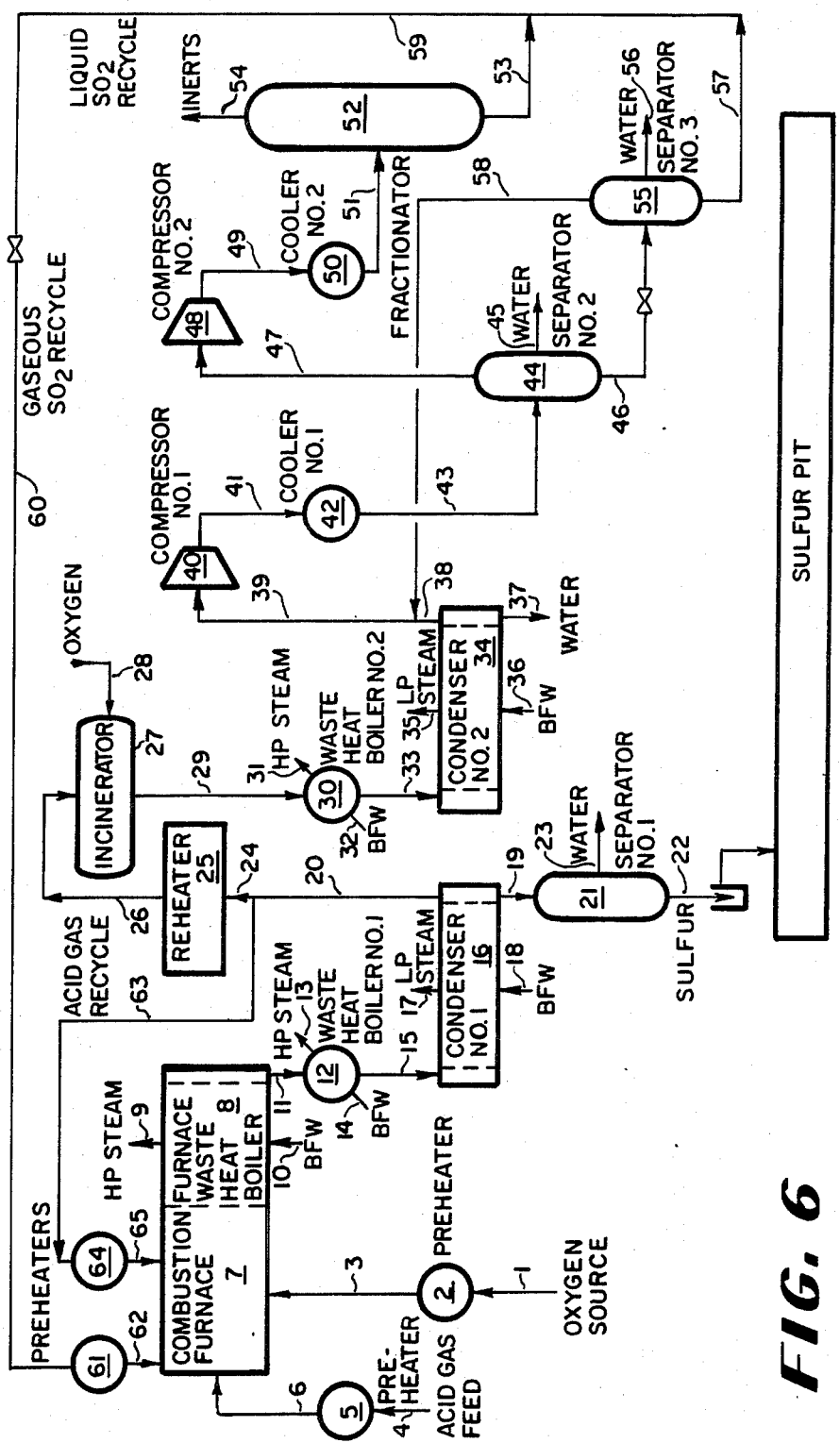
FIG. 6 is a schematic diagram of an improved high pressure oxygen-based non-catalytic Claus sulfur recovery process with concurrent sulfur and water condensation and with SO$_2$ recycle.

Shown in FIG. 6 is a novel improved Claus sulfur recovery process which achieves a high degree of sulfur recovery, without utilizing the conventional catalytic converter train, by the partial incineration of the tail gas to $SO_2$, followed by the condensation of water and the recovery and recycling of $SO_2$. FIG. 6 illustrates a process for recovering elemental sulfur from a gas containing hdyrogen sulfide wherein said gas is combusted in a furnace with an oxygen-containing gas to provide hydrogen sulfide and sulfur dioxide followed by the reaction of hydrogen sulfide and sulfur dioxide to form water and sulfur, the reacted combustion effluent stream is cooled in a waste heat boiler, the cooled gaseous stream is divided into a combined liquid water and sulfur stream and a first remaining process gas stream substantially free of water, both at a temperature above the sulfur melting point, the combined liquid water and sulfur stream is separated into a product liquid water stream and product liquid sulfur stream, the bulk of the first remaining process gas stream is recycled to the combustion furnace while the second remaining process gas stream is incinerated to convert the remaining sulfur species to sulfur dioxide, which incinerated gas stream is cooled, dehydrated, liquefied and recycled to the combustion furnace.

In FIG. 6, the oxygen source 1 is heated in preheater 2 and the acid gas feed 4 is preheated in preheater 5. The heated oxygen source 3 and heated acid gas feed 6 enter the combustion furnace 7. The furnace product gases are cooled in a furnace waste heat boiler 8, which boiler produces high pressure steam 9 from boiler feed water 10. The cooled gases 11 are further cooled in the first waste heat boiler 12, which boiler produces high pressure stream 13 from boiler feed water 14.

The cooled gases 15 are further cooled in the first condenser 16, which condenser produces low pressure steam 17 from boiler feed water 18. In the first condenser 16, a liquid sulfur and water stream 19 is condensed out and the cold process gas stream 20 is further processed. The condensed liquid stream 19 is divided in the first separator 21 into a liquid sulfur stream 22 and a liquid water stream 23.

The cold process gas stream 20 is divided into streams 24 and 63. The cold process stream 24 is heated in reheater 25. The heated process stream 26 is burned in incinerator 27 with oxygen 28 to convert all sulfur species to $SO_2$. The incinerated process gas 29 is cooled in waste heat boiler 30, which boiler produces high pressure steam 31 from boiler feed water 32. The cooled process gas 33 is further cooled in the second condenser 34, which condenser produces low pressure steam 35 from boiler feed water 36. In the second condenser 34, a liquid water stream 37 is condensed out and the cold gases 38 and 39 are further processed.

The cold gas 39 is optionally compressed in the first compressor 40. The compressed gas 41 is cooled in the first cooler 42. The cooled gas 43 is divided in the second separate 44 into a liquid water stream 45, a liquid sulfur dioxide and water stream 46, and a remaining process gas stream 47.

The remaining process gas stream 47 is optionally compressed in the second compressor 48. The compressed gas 49 is cooled in the second cooler 50. The cooled gas 51 is divided in the fractionator 52 into a first liquid sulfur dioxide bottoms stream 53 and a remaining inert product stream 54.

First compressor 40 and second compressor 48, with associated equipment, can be eliminated if the front-end pressure is sufficiently high for separation to properly occur in fractionator 52.

The liquid sulfur dioxide and water stream 46 is reduced in pressure and further divided in the third separator 55 into a liquid water stream 56, a second liquid sulfur dioxide bottoms stream 57, and a remaining process gas stream 58. Remaining process gas stream 58 is combined with the cold gas stream 38 to form the combined stream 39, which combined stream feeds the first compressor 40.

First bottoms stream 53 and second bottoms stream 57 are combined to form a third liquid sulfur dioxide stream 59, which stream is reduced in pressure to form stream 60. Stream 60 is heated in preheater 61, and the heated stream 62 enters combustion furnace 7. Stream 20 is divided into acid gas streams 24 and 63. Acid gas stream 63 is heated in preheater 64, and the heated stream 65 enters combustion furnace 7.

For example, a 92% $H_2S$-containing feed gas is compressed to about 80 psia, preheated to about 700° F., and fed to a Claus combustion furnace. Additionally, acid gas and $SO_2$ recycle streams are preheated and fed to the furnace. The furnace effluent gas is cooled by a waste heat boiler, and then a combined sulfur and water stream is condensed out and enters a first separator. The remaining gas from the condenser is then divided, part of the gas being recycled to the front-end furnace for temperature moderation and further conversion to elemental sulfur. The remainder of the gas comprising $H_2S$, $SO_2$, and sulfur vapor is reheated and enters, with the appropriate amount of $O_2$, a thermal incinerator where substantially all the reducing sulfur species and trace elemental sulfur are oxidized to $SO_2$. The hot effluent gas is then cooled to about 200° F., and water is condensed and separated out.

The gas leaving the second condenser comprising about 75% $SO_2$, 15% $H_2O$ and 10% $CO_2$ is then compressed in several stages to about 300 psia for distillation. In the step-wise compression all the water is removed. Additionally, a significant portion of $SO_2$, as a separate liquid phase, is recovered and recycled back to the front-end Claus conmbustion furnace for conversion to elemental sulfur. The remaining compressed dry gas consisting of about 49% $CO_2$ and 51% $SO_2$ is cooled to about 100° F. and fed to a distillation column where the last portion of $SO_2$ is separated from $CO_2$ and other inerts and is recycled to the front-end Claus furnace for conversion to elemental sulfur. The overall sulfur recovery from the gas is near 100% (less than 1 ppm $SO_2$ in the vent gas). Traces of $SO_2$ dissolved in various water streams can be stripped off by the feed $O_2$ and recycled to the furnace. Table 3, Case 1 shows the major process variables for this example.

TABLE 3

High Pressure Oxygen-Based Non-Catalytic Process
Basis: $H_2S$ = 100 lb mole/hr (92%)
Total = 108.2 lb mole/hr

|  | Case 1 $SO_2$ Recycle | Case 2 $SO_2$ Co-production |
|---|---|---|
| Combustion Furnace/Waste-Heat Boiler/Separator | | |
| Pressure, psia | 80 | 80 |
| Temperature, °F. | 2223.4 | 2218.8 |
| Sulfur Conversion, % | 68.3 | 94.3 |
| Water Condensed, lb mole/hr | 47.1 | 89.3 |
| Total Flow Entering Furnace, | | |
| acfm | 697.3 | 1111.8 |
| lb mole/hr | 269.9 | 430 |
| Incinerator/Waste Heat Boiler/Condenser | | |
| Temperature, °F. | 2473.5 | 2824.7 |
| Water Condensed, lb mole/hr | 97.0 | 102.5 |
| Total Flow Entering Incinerator, | | |
| acfm | 181.4 | 55.4 |
| lb mole/hr | 117.2 | 30.0 |
| Compression/Separator Skid | | |
| Stage 1 | | |
| Pressure, psia | 165 | 165 |
| Compressor Outlet Temperature, °F. | 317.1 | 328 |
| Sulfur Removal, % | 94.3 | 94.4 |
| Water Condensed, lb mole/hr | 103.1 | |
| Stage 2 | | |
| Pressure, psia | 310 | 310 |
| Compressor Outlet Temperature, °F. | 204.1 | 204.8 |
| Sulfur Removal, % | 98.0 | 96.9 |
| Stage 3 | | |
| Pressure, psia | * | 610 |
| Compressor Outlet Temperature, °F. | | 214.6 |
| Sulfur Removal, % | | 99.0 |
| Water Condensed, lb mole/hr | | |
| Stage 4 | | |
| Pressure, psia | * | 1200 |
| Compressor Outlet Temperature, °F. | | 220.7 |
| Sulfur Removal, % | | 99.5 |
| Water Condensed, lb mole/hr | | |
| Distillation (15 stages) | | |
| Overhead | | |
| Temperature, °F. | −11.0 | * |
| Flow Rate, lb mole/hr | 5.2 | |
| $SO_2$ in Overhead, ppm | <½ | |
| Net Sulfur removal, % | 100 | |
| Bottoms | | |
| Temperature, °F. | 163.9 | * |
| Flow Rate, lb mole/hr | 6.0 | |
| $SO_2$ in Bottoms, % | 94.9 | |
| $CO_2$ in Bottoms, % | 3.9 | |

*Is not required.

The key features of this embodiment are water condensation with liquid sulfur in the separator in the front-end furnace section, $SO_2$ and water condensation in the backend condenser after incineration, compressor interstage with coolers, and distillative separation of $SO_2$ from inerts. This example again demonstrates the advantages of the high pressure operation. The gas flow throughout the process is very small. The plant size and cost are significantly smaller than prior art low pressure processes.

The process scheme described in FIG. 6 is illustrative and other variations within the scope of the invention are effective for a near complete sulfur recovery. For example, the intermediate compression steps can be omitted in the process shown in FIG. 6. These comprise compressors 40 and 48, coolers 42 and 50, and separators 44 and 55. The gas 38 leaving the condenser 34 and can be dried by any known drying method (e.g. silica gel adsorption, activated alumina, etc.) and then fed to the distillation column. This scheme will reduce the complexity of the process yet retain all the benefits derived from the high pressure operation.

Distillation is the best known unit operation to reduce sulfur emission down to parts per million (ppm) level. When pure oxygen is used to treat an $H_2S$-rich stream, a near 100% sulfur recovery is achieved yet nowhere in the process are catalysts of any sorts employed. This is a key novel feature of high pressure Claus processes of the instant embodiment.

Figure 7:
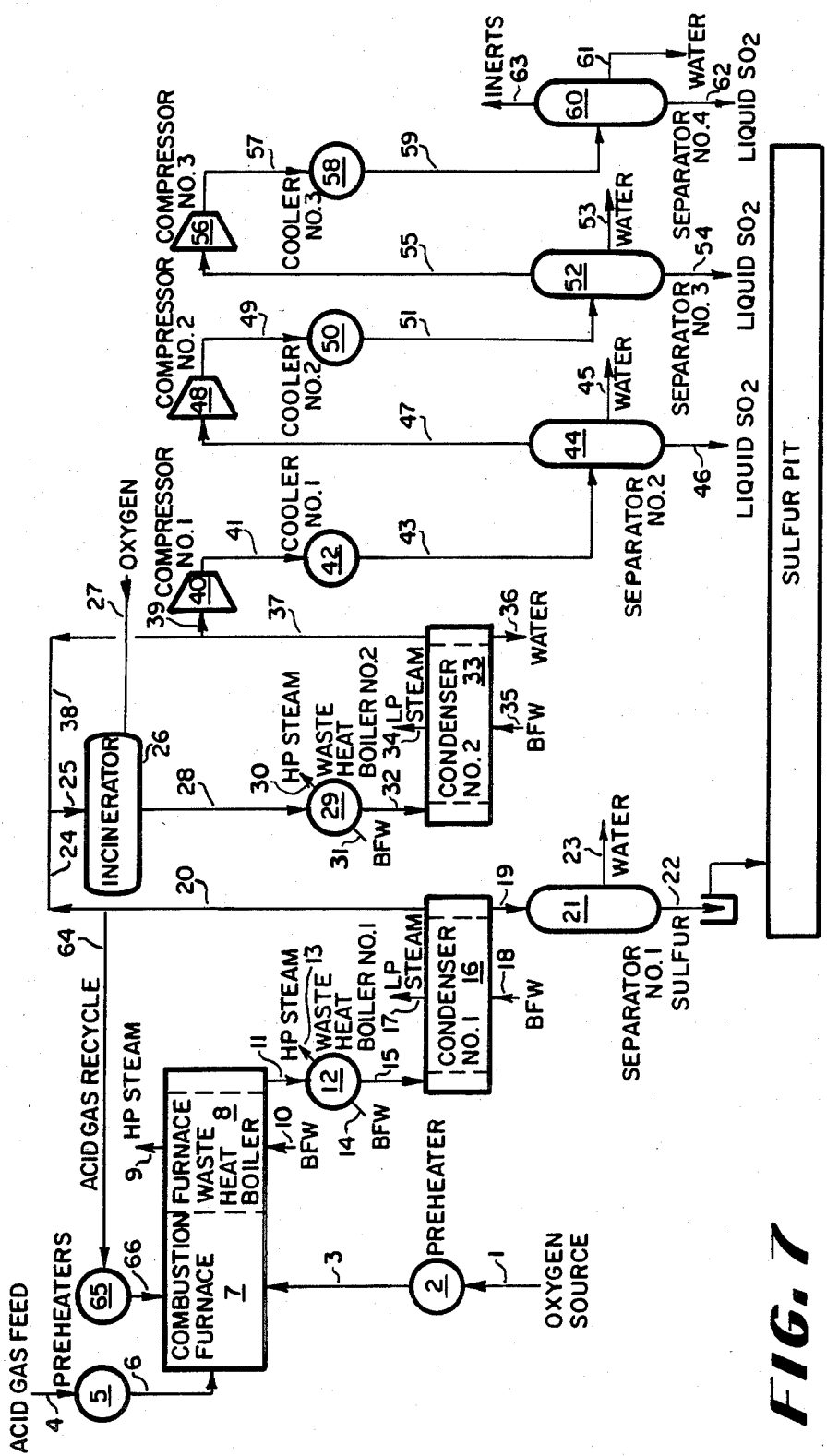
FIG. 7 is a schematic diagram of an improved high pressure oxygen-based non-catalytic Claus sulfur recovery process with concurrent sulfur and water condensation and with SO$_2$ as a co-product.

FIG. 7 shows a process scheme which co-produces liquid sulfur dioxide as well as elemental sulfur. The scheme is similar to FIG. 6. The front-end Claus combustion furnace section is the same except that there are no SO$_2$ recycle streams to this section.

In FIG. 7, the oxygen source 1 is heated in preheater 2 and the acid gas feed 4 is preheated in preheater 5. The heated oxygen source 3 and heated acid gas feed 6 enter the combustion furnace 7. The furnace product gases are cooled in a furnace waste heat boiler 8, which boiler produces high pressure steam 9 from boiler feed water 10. The cooled gases 11 are further cooled in the first waste heat boiler 12, which boiler produces high pressure stream 13 from boiler feed water 14.

The cooled gases 15 are further cooled in the first condenser 16, which condenser produces low pressure steam 17 from boiler feed water 18. In the first condenser 16, a liquid sulfur and water stream 19 is condensed out and the cold process gas stream 20 is further processed. The condensed liquid stream 19 is divided in the first separator 21 into a liquid sulfur stream 22 and a liquid water stream 23.

The cold process gas stream 20 is divided into streams 24 and 64. The cold process streams 24 and 25 are burned in incinerator 26 with oxygen 27. The incinerated process gas 28 is cooled in waste heat boiler 29, which boiler produces high pressure steam 30 from boiler feed water 31. The cooled process gas 32 is further cooled in the second condenser 33, which condenser produces low pressure steam 34 from boiler feed water 35. In the second condenser 33, a liquid water steam 36 is condensed out and the cold gas 37 is further processed.

Cold gas 37 is divided into streams 38 and 39. Cold gas 38 is combined with stream 24 to form stream 25. Cold gas 39 is compressed in the first compressor 40. The compressed gas 41 is cooled in the first cooler 42. The cooled gas 43 is divided in the second separator 44 into a liquid water stream 45, a liquid sulfur dioxide product stream 46, and a remaining process gas stream 47.

Process gas stream 47 is compressed in the second compressor 48. The compressed gas 49 is cooled in the second cooler 50. The cooled gas 51 is divided in the third separator 52 into a liquid water stream 53, a liquid sulfur dioxide product stream 54, and a remaining process gas stream 55.

Process gas stream 55 is compressed in the third compressor 56. The compressed gas 57 is cooled in the third cooler 58. The cooled gas 59 is divided in the third separator 60 into a liquid water stream 61, a liquid sulfur dioxide product stream 62, and a remaining inert product stream 63. Acid gas stream 64 is heated in preheater 65, and the heated acid gas stream 66 enters combustion furnace 7.

For illustration, at 80 psia operating pressure the sulfur recovered from the first separator is about 94.3% as shown in Case 2 of Table 3. The net gas containing the sulfur species are oxidized to SO$_2$ in the incinerator. The hot gas is cooled to condense out water. Part of overhead gas is recycled to the incinerator for temperature control The remaining gas is then compressed to 610 psia in three stages with interstage cooling to recovery liquid SO$_2$. The overall sulfur removal is 99.0%. If one more compression stage to 1200 psia is employed, then 99.5% sulfur removal is achieved. The key process variables are listed in Case 2 of Table 3. The distillation stage is not required.

The liquid SO$_2$ co-product in this example is about 5% of the feed H$_2$S. Co-production of SO$_2$ can be increased by increasing the gas flow 24 to the incinerator and reducing the recycle 64.

Similarly to the process shown in FIG. 6, the number of compressor stages can be reduced or eliminated if the front-end pressure is sufficiently high for separation of liquid SO$_2$ to occur.

Figure 8:
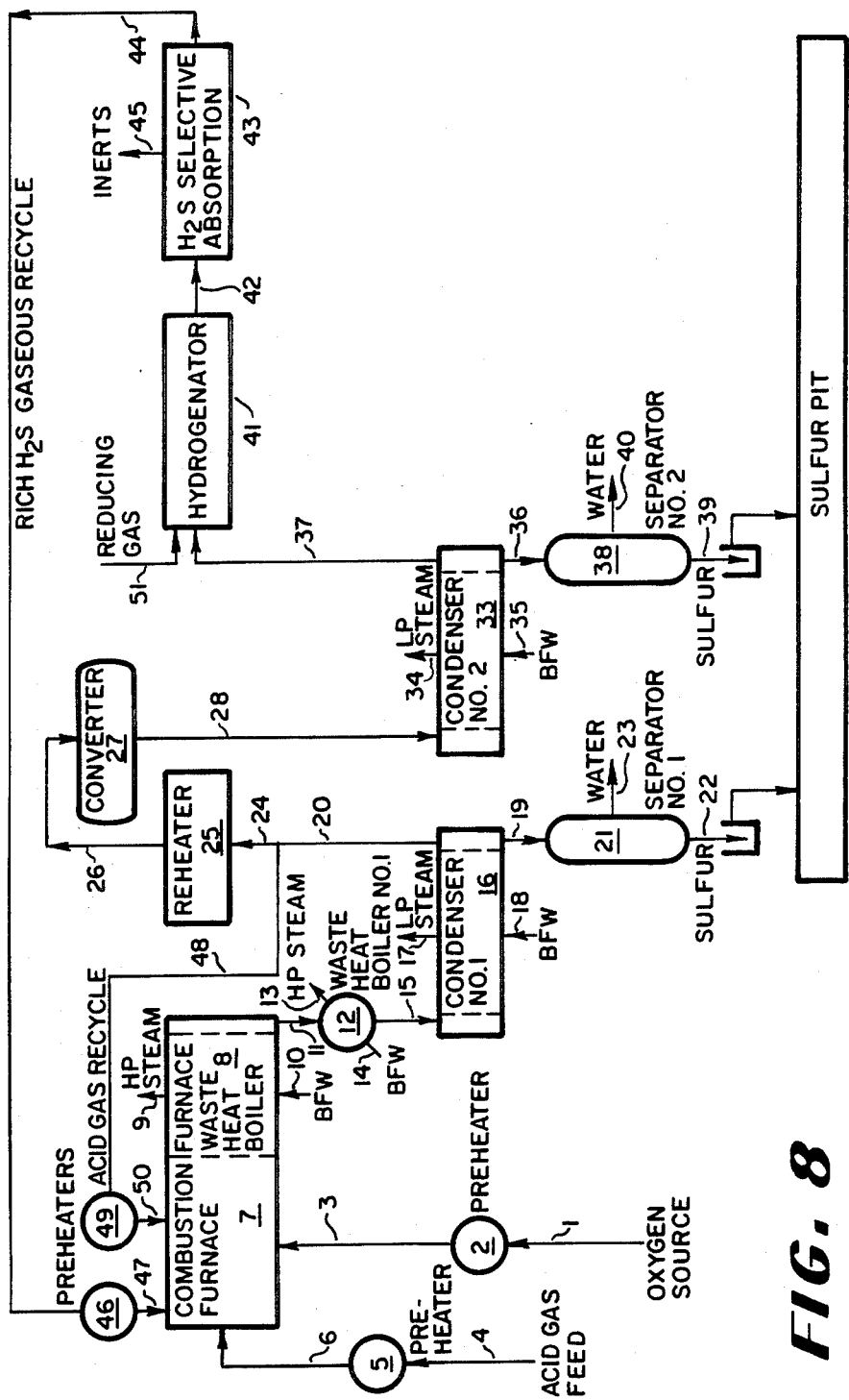
FIG. 8 is a schematic diagram of an improved high pressure oxygen-based catalystic Claus one-stage sulfur recovery process with concurrent sulfur and water condensation and with rich H$_2$S recycle.

FIG. 8 shows another example of post-treatment for high sulfur recovery. The net gas leaving the front-end furnace section is reheated and fed to (optionally) one or more catalytic Claus converters for increased sulfur recovery. The overhead gas leaving the last stage separator is then combined with an appropriate amount of reducing gas, which for example can be H$_2$ or CO or both, and fed to a catalytic hydrogenator to reduce all the sulfur species to H$_2$S. The effluent gas is then passed to an H$_2$S selective absorption (e.g. MDEA) section or other separation schemes to recover the residual H$_2$S gas, which residual gas is then recycled to the front-end Claus furnace section. This process scheme provides an alternative post-treatment to the SO$_2$ S recycle process described previously in FIG. 6.

In FIG. 8, the oxygen source 1 is heated in preheater 2 and the acid gas feed 4 is preheated in preheater 5. The heated oxygen source 3 and heated acid gas feed 6 enter the combustion furnace 7. The furnace product gases are cooled in a furnace waste heat boiler 8, which boiler produces high pressure steam 9 from boiler feed water 10. The cooled gases 11 are further cooled in the first waste heat boiler 12, which boiler produces high pressure stream 13 from boiler feed water 14.

The cooled gases 15 are further cooled in the first condenser 16, which condenser produces a low pressure steam 17 from boiler feed water 18. In the first condenser 16, a liquid sulfur and water stream 19 is condensed out and the cold process gas stream 20 is further processed. The condensed liquid stream 19 is divided in the first separator 21 into a liquid sulfur stream 22 and a liquid water stream 23.

The cold process gas stream 20 from the first condenser 16 is divided into streams 24 and 48. Stream 24 is heated in the first reheater 25. The heated process gas stream 26 is reacted in the catalytic converter 27. The converted process gas stream 28 is cooled in the second condenser 33, which condenser produces low pressure steam 34 from the boiler feed water 35. In the second condenser 33, liquid sulfur and water 36 is condensed out and the cold gas stream 37 is further processed. The liquid sulfur and water stream 36 is divided in the second separator 38 into a liquid sulfur stream 39 and a liquid water stream 40.

The cold process gas stream 37 is hydrogenated in hydrogenator 41 with reducing gas stream 51. The hydrogenated gas stream 42 is further processed in absorption unit 43 wherein H$_2$S is selectively absorbed into stream 44 and remaining inert product stream 45 is produced. The H$_2$S stream 44 is heated in preheater 46, and the heated H$_2$S stream 47 enters the combustion furnace 7 for the purpose of further sulfur conversion. Stream 20 is divided into acid gas streams 24 and 48. Acid gas stream 48 is heated in preheater 49, and the heated stream 50 enters the combustion furnace 7.

Table 4 summarizes two example cases for this process. Case 1 of Table 4 shows that very high overall sulfur recovery (99.8%) is achieved with a very small backend flowrate and recycle H$_2$S stream. This is possible only by operating at the high pressure taught by the present invention to condense out water with sulfur throughout the process. Case 2 of Table 4 shows that an increased overall sulfur recovery (99.9%) is achieved, with decreased backend flowrate and decreased recycle H$_2$S stream, when the operating pressure is increased.

TABLE 4

Hydrogen Sulfide Recycle Process
Basis: Feed H$_2$S = 100 lb mole/hr (92%)
Total Feed = 108.2 lb mole/hr

|  | Case 1 | Case 2 |
|---|---|---|
| Combustion Furnace/Waste-Heat Boiler/Separator |  |  |
| Pressure, psia | 80 | 160 |
| Temperature, °F. | 2385.9 | 2776.6 |
| Dew Point, °F. | 268.6 | 300.2 |
| Sulfur Conversion, % | 93.5 | 95.0 |
| Water Condensed, lb mole/hr | 88.5 | 96.1 |
| Oxygen Requirements, lb mole/(lb mole H$_2$S Feed) | 0.51 | 0.50 |
| Total Flow Entering Furnace, |  |  |
| acfm | 581.9 | 398.3 |
| lb mole/hr | 391.2 | 308.2 |
| Back End Flow Rate, |  |  |
| acfm | 40.3 | 13.0 |
| lb mole/hr | 25.6 | 16.5 |
| Catalytic Stage/Separator |  |  |
| Inlet Temperature, °F. | 500 | 500 |
| Outlet Temperature, °F. | 748.8 | 823.1 |
| Dew Point, °F. | 596.8 | 674.3 |
| Sulfur Conversion, % | 97.8 | 98.6 |
| Water Condensed, lb mole/hr | 95.1 | 99.7 |
| Inlet Gas Flow Rate, acfm | 54.4 | 17.6 |
| Hydrogenator |  |  |
| Inlet Temperature, °F. | 500 | 500 |
| Outlet Temperature, °F. | 1116.9 | 1274.8 |
| Dew Point, °F. | 260.4 | 276.7 |
| Hydrogen Flow Rate, lb mole/hr | 9.3 | 6.8 |
| H$_2$S Formed, lb mole/hr | 2.2 | 1.4 |
| Inlet Gas Flow Rate, acfm | 52.9 | 17.2 |
| MDEA Scrubber |  |  |
| Sulfur Removal, % | 99.8 | 99.9 |
| Vent Gas Flow Rate, lb mole/hr | 20.5 | 12.9 |
| Sulfur in Vent Gas, % | 0.8 | 0.8 |
| H$_2$S Recycle Flow Rate, lb mole/hr | 2.0 | 1.3 |

FIG. 9 shows a modification of the process shown in FIG. 8 wherein reheater 25, converter 27, condenser 33, and separator 38 are eliminated with resultant cost savings. This non-catalytic Claus process will result in an increase in the H$_2$S content of the recycle stream 44.

In summary, a new class of high pressure Claus processes are proposed for high sulfur recovery from an H$_2$S-containing gas by improvement to the process comprising condensing water along with liquid sulfur above the sulfur melting point (>248° F.). This process step is preferably incorporated in the front-end Claus furnace section. The bulk of sulfur is recovered in the first separator. The bulk of the overhead gas is preferably recycled to the furnace. Any gas purge flow containing sulfur species may be treated in the backend section by one or more known process steps.

While illustrating and describing specific embodiments of the process and apparatus, it is readily apparent that many minor changes and modifications thereof could be made without departing from the spirit of the invention.

What is claimed is:

1. A process for recovering elemental sulfur from a gas containing hydrogen sulfide comprising combusting the gas containing hydrogen sulfide in a furnace with a oxygen-containing gas to provide hydrogen sulfide and sulfur dioxide followed by the reaction of the hydrogen sulfide and sulfur dioxide forming a gaseous stream comprising water vapor, sulfur vapor, and other acid gas components, cooling and dividing the formed gaseous stream into a combined liquid water and liquid sulfur stream and a remaining process gas stream substantially free of water at a pressure greater than 50 psia such that water and sulfur are condensed concurrently and at a temperature above the sulfur melting point of approximately 248° F., and subsequently separatig the combined liquid water and liquid sulfur stream into a product liquid water stream and a product liquid sulfur stream.

2. The process of claim 1 wherein pressure is greater than 160 psia.

3. The process of claim 1 wherein the oxygen is supplied by air.

4. The process of claim 1 wherein the oxygen is supplied by oxygen-enriched air with an oxygen content of greater than 21%.

5. The process of claim 1 wherein the oxygen is supplied by pure oxygen.

6. The process of claim 1 wherein a portion of the remaining process gas stream is divided into a recycle stream to the furnace.

7. The process for recovering elemental sulfur from a gas containing hydrogen sulfide wherein a gaseous stream is formed by catalytically reacting the gas containing hydrogen sulfide by means of a catalytic oxidizer with an oxygen-containing gas to provide hydrogen sulfide and sulfur dioxide followed by the catalytic reaction of the hydrogen sulfide and sulfur dioxide to form water and sulfur under appropriate temperature and pressure conditions such that a portion of the sulfur is condensed out in and removed from the catalyst bed as a liquid sulfur product stream and such that the water exists only as a water vapor, which water vapor, admixed with the remaining sulfur in vapor phase, forms a second gaseous stream comprising water vapor, sulfur vapor and other acid gas components, cooling and dividing the formed second gaseous stream into a combined liquid water and liquid sulfur stream and remaining process gas stream substantially free of water a pressure greater than 50 psia such that water and sulfur are condensed concurrently and at a temperature above the sulfur melting point of approximately 248° F., and subsequently separating the combined liquid water and liquid sulfur stream into a product liquid water stream and a product liquid sulfur stream.

8. The process of claim 7 wherein pressure is greater than 160 psia.

9. The process of claim 7 wherein the oxygen is supplied by air.

10. The process of claim 7 wherein the oxygen is supplied by oxygen-enriched air with an oxygen content of greater than 21%.

11. The process of claim 7 wherein the oxygen is supplied by pure oxygen.

12. The process of claim 7 wherein a portion of the cooled gaseous stream is divided into a recycle stream to the catalytic oxidizer.

13. A process for recovering elemental sulfur from a gas containing hydrogen sulfide, said process comprising:

(a) combusting said gas in a furnace with an oxygen-containing gas to provide hydrogen sulfide and sulfur dioxide followed by the reaction of the hydrogen sulfide and sulfur dioxide to form a gaseous stream comprising water vapor, sulfur vapor, and other acid gas components;

(b) cooling the gaseous stream in a waste heat boiler;

(c) partially condensing the cooled gaseous stream at a pressure greater than 50 psia such that water and sulfur are condensed concurrently to divide said stream into a combined liquid water and liquid sulfur stream and a first remaining process gas stream substantially free of water, both at a temperature above the sulfur melting point of approximately 248° F.;

(d) separating the combined liquid water and liquid sulfur stream into a product liquid water stream and product liquid sulfur stream;

(e) dividing the first remaining process gas stream into a recycle stream to the combustion furnace and a second remaining process gas stream;

(f) incinerating the second remaining process gas stream to convert the remaining sulfur to sulfur dioxide;

(g) cooling the incinerated gas stream containing sulfur dioxide in a waste heat boiler;

(h) dehydrating the cooled gas stream;

(i) liquefying the dehydrated gas stream; and (j) recycling the liquefied stream to the combustion furnace.

14. The process of claim 13 wherein pressure in greater than 160 psia.

15. The process claim 13 wherein the oxygen is supplied by air.

16. The process of claim 13 wherein the oxygen is supplied by oxygen-enriched air with an oxygen content of greater than 21%.

17. The process of claim 13 wherein the oxygen is supplied by pure oxygen.

* * * * *